United States Patent [19]

Bindon

[11] Patent Number: 5,653,034
[45] Date of Patent: Aug. 5, 1997

[54] REFLEX SIGHTING DEVICE FOR DAY AND NIGHT SIGHTING

[75] Inventor: Glyn A. J. Bindon, South Lyon, Mich.

[73] Assignee: Trijicon, Inc., Wixom, Mich.

[21] Appl. No.: 449,825

[22] Filed: May 24, 1995

[51] Int. Cl.$^6$ ............................................. F41G 1/34
[52] U.S. Cl. ............................ 33/241; 33/297; 359/353
[58] Field of Search ........................ 33/242, 241, 243, 33/246, 233, 252, 297, 298; 359/353, 354

[56] References Cited

U.S. PATENT DOCUMENTS

| | | |
|---|---|---|
| 2,780,130 | 2/1957 | Mauer . |
| 3,641,676 | 2/1972 | Knutsen et al. ............................ 33/241 |
| 3,645,635 | 2/1972 | Steck . |
| 3,678,590 | 7/1972 | Hayward . |
| 3,880,529 | 4/1975 | Althause et al. ............................ 359/495 |
| 3,897,158 | 7/1975 | Steck, III . |
| 3,905,708 | 9/1975 | Steck, III . |
| 3,932,162 | 1/1976 | Blankenship . |
| 3,938,875 | 2/1976 | Ruder et al. . |
| 3,942,901 | 3/1976 | Ekstrand . |
| 4,030,203 | 6/1977 | Ackeman, Jr. . |
| 4,070,763 | 1/1978 | Carts, Jr. ............................ 33/241 |
| 4,417,814 | 11/1983 | Doliber ............................ 356/252 |
| 4,576,451 | 3/1986 | Tominaga . |
| 4,665,622 | 5/1987 | Idan . |
| 4,743,765 | 5/1988 | Ekstrand . |
| 4,764,011 | 8/1988 | Goldstein . |
| 4,806,007 | 2/1989 | Bindon . |
| 4,877,324 | 10/1989 | Hauri et al. . |
| 5,054,225 | 10/1991 | Giuffre et al. . |
| 5,084,780 | 1/1992 | Phillips ............................ 359/353 |
| 5,359,800 | 11/1994 | Fisher et al. ............................ 33/242 |
| 5,452,131 | 9/1995 | Vorlov . |

FOREIGN PATENT DOCUMENTS

| | | | |
|---|---|---|---|
| 1-29827 | 1/1989 | Japan ............................ | 33/297 |
| 318892 | 3/1957 | Switzerland . | |

OTHER PUBLICATIONS

Optectron—Plastifo brochure Sep. 1991.

Primary Examiner—G. Bradley Bennett
Attorney, Agent, or Firm—Harness, Dickey & Pierce, P.L.C.

[57] ABSTRACT

A reflex sighting device for day and night sighting including a light collector assembly for providing illumination for a reticle pattern for sighting and having a fiber optic light collector section defined by an optical fiber arranged to receive ambient light directed radially inwardly into the optical fiber and having a lens for focusing the ambient light radially inwardly into the optical fiber and including an artificial light source for providing lighting for night time illumination of the reticle pattern.

52 Claims, 7 Drawing Sheets

_Fig-11_

_Fig-13_

_Fig-12_

REFLEX SIGHTING DEVICE FOR DAY AND NIGHT SIGHTING

SUMMARY BACKGROUND OF THE INVENTION

The present invention relates to an optical sighting device for day or night sighting and more particularly to a reflex sighting device.

Reflex sights are well-known and have taken a variety of forms, such as in gun sights and camera view finders. In substantially all forms, however, some type of reticle pattern is utilized to mark the area or object of interest. Light or the illuminated image from this reticle pattern is reflected from a semi-transparent, semi-reflective mirror or lens surface through which the object or field is viewed. The curvature of the semi-reflecting surface is such as to direct the reflected rays of the reticle image to converge approximately at the same viewing point of the operator as the transmitted rays of the object or field being sighted and thereby to make the reticle pattern appear at infinity and superimposed upon the object or field and at approximately the same distance.

In accordance with the present invention there is provided a reflex sight comprising a reticle and a dichroic beam combining mirror for combining rays of light from the reticle with rays of light from an object or field. The dichroic mirror has high reflectance in one part of the visible spectrum and high transmittance in the other parts to provide the dual image to the viewer or operator.

It has been found that in using sighting devices, for example for aiming weapons, cameras and the like, that sighting with both eyes open is advantageous. When sighting with both eyes open, the operator has the benefit of binocular vision which increases the field of view, provides depth perception information, increases contrast sensitivity and assists the sense of balance. The assessment of the speed and direction of moving objects is also more accurate.

Temporarily closing one eye during aiming interrupts the visual signal from one eye and can begin to change the state of light adaptation and point in space upon which the open eye was fixed.

As noted, frequently a dichroic mirror is utilized in reflex sights. Such a dichroic mirror reflects nearly all light above one wavelength and transmits nearly all light below that wavelength. If a red or orange dot is used as the aiming mark or reticle, the mirror will reflect red/orange light and transmit yellow, green and blue light. Thus the dichroic mirror changes the color of a target scene. If the target is viewed with one eye only, the loss of the red color from the target area will be observed. When the other eye is opened, the missing color will be put back into the target scene perceived by the viewer or operator.

In general all optical sights are provided with an aiming mark or reticle and have a common benefit by presenting the aiming mark at the same focus as the target. In this regard it is believed that a reflex sight, which is non-magnifying, is particularly advantageous for aiming with both eyes open because it does not interrupt binocular vision at all, i.e. such as with telescopic or magnifying optical sights. Regardless of the type of sighting device, however, it is desirable to provide a limited contrast between the level of brightness of the reticle and that of the target or scene. However, for day and night sighting, the aiming mark contrast can be inconsistent. For example if the aiming mark or reticle is extremely bright it may be most suitable for aiming at brightly lit target scenes but could be too bright for dimly lit target scenes and, of course, the reverse is also true.

Thus aiming at a dark object in heavy shade can be difficult or inaccurate without a suitable means to improve contrast of the aiming mark or reticle. In the past, numerous ways have been devised whereby the aiming mark brightness can be varied to improve contrast with the target scene, i.e. battery powered LEDs, electric lights, etc. which are controlled manually or electronically.

In the present invention a unique construction is utilized to vary the reticle brightness in proportion to the target scene brightness in day and night sighting while providing an illumination intensity for day sighting which provides a desired contrast comparable to that of an artificial light source for night sighting. Another objective is to provide a design in which compensating variations in reticle brightness occur naturally without the need for manual adjustment such as with a brightness knob or electronic control.

A unique fiber optic structure is utilized in which a fiber optic light collector receives ambient light focused transversely or radially inwardly over a selected length of fiber whereby a desired magnitude of light energy can be gathered from ambient light to provide illumination to the reticle. In addition a radio-luminescent source is used in combination with the fiber optic collector resulting in a combined illumination whereby a desired level of illumination can be provided to the reticle over the full range of brightness during day and night sighting.

Thus it will be seen that the unique features of the present invention provide a significant improvement over other sighting devices including ones as shown and described in the U.S. Pat. No. 2,780,130 issued Feb. 5, 1957 to Mauer, U.S. Pat. No. 3,645,635 issued Feb. 29, 1972 to Steck, U.S. Pat. No. 3,905,708 issued Sep. 16, 1975 to Steck, III, U.S. Pat. No. 3,932,162 issued Jun. 13, 1976 to Blakenship, U.S. Pat. No. 3,938,875 issued Feb. 17, 1976 to Ruder, U.S. Pat. No. 4,030,203 issued Jun. 21, 1977 to Ackerman Jr., U.S. Pat. No. 4,576,451 issued Mar. 18, 1986 to Tomenaga, U.S. Pat. No. 4,665,622 issued May 19, 1987 to Idan, U.S. Pat. No. 4,764,011 issued Aug. 16, 1988 to Goldstein, U.S. Pat. No. 4,806,007 issued Feb. 21, 1989 to Bindon and U.S. Pat. No. 4,877,324 issued to Hauri et al.

Thus it is an object of the present invention to provide a unique reflex sighting device for day and night sighting.

It is another object of the present invention to provide a unique reflex sighting device with improved illumination for the reticle.

It is still another object of the present invention to provide a unique reflex sighting device in which the illumination of the reticle is varied naturally in accordance with the illumination of the target or viewing area.

It is a general object of the present invention to provide a unique reflex sighting device for day and night sighting.

It is another object of the present invention to provide a unique reflex sighting device for day and night sighting and for sighting with both eyes opened.

Other objects, features and advantages of the present invention will become apparent from the subsequent description and the appended claims, taken in conjunction with the accompanying drawings, in which:

DETAILED DESCRIPTION OF EMBODIMENTS OF THE INVENTION

It will be seen from the description which follows that the reflex sighting device of the present invention utilizes a light collector assembly having a fiber optic structure designed to gather a significant, predetermined quantity of the available ambient light focused thereon. The light collected by the fiber optic structure is then transmitted to a reticle defining structure which is located to transmit a reticle image or pattern onto a dichroic lens or mirror. In addition, further illumination of the reticle structure is provided by a source of artificial light such as a tritium lamp. The illumination from the light collector assembly is provided primarily for day sighting while the illumination from the tritium lamp is primarily for night sighting. Both sources of illumination are applied to the reticle defining structure at the same time. Since it is desired that the level of illumination of the reticle pattern be a function of the level of illumination of the object or scene being viewed through the sight the magnitude of illumination from the tritium lamp will be considerably less than that from the collector assembly. Thus in a bright daylight condition the level of reticle illumination will be determined primarily by the collector assembly while night illumination will be primarily determined by the tritium lamp. The magnitude of illumination of the tritium lamp can be further reduced by imposing a movable mask or shield between the lamp and the fiber to permit selective attenuation or blockage of the illumination from the lamp. As previously noted it is desirable to have the level of illumination of the reticle varied in accordance with the level of illumination of the object or scene being viewed while at the same time providing the desired degree of contrast. The level of illumination from the collector assembly with its fiber optic structure will vary naturally in accordance with the daylight illumination of the object or scene being viewed and in this regard will be balanced with a known level of illumination provided by the artificial light source. In addition the amount of light collected can be selected to provide the desired degree of contrast with the scene being viewed over the full range of luminance of the scene. In addition, however, features of the present invention can be used to collect ambient light from different directions such as the brighter overhead sky.

Figures 1, 2:
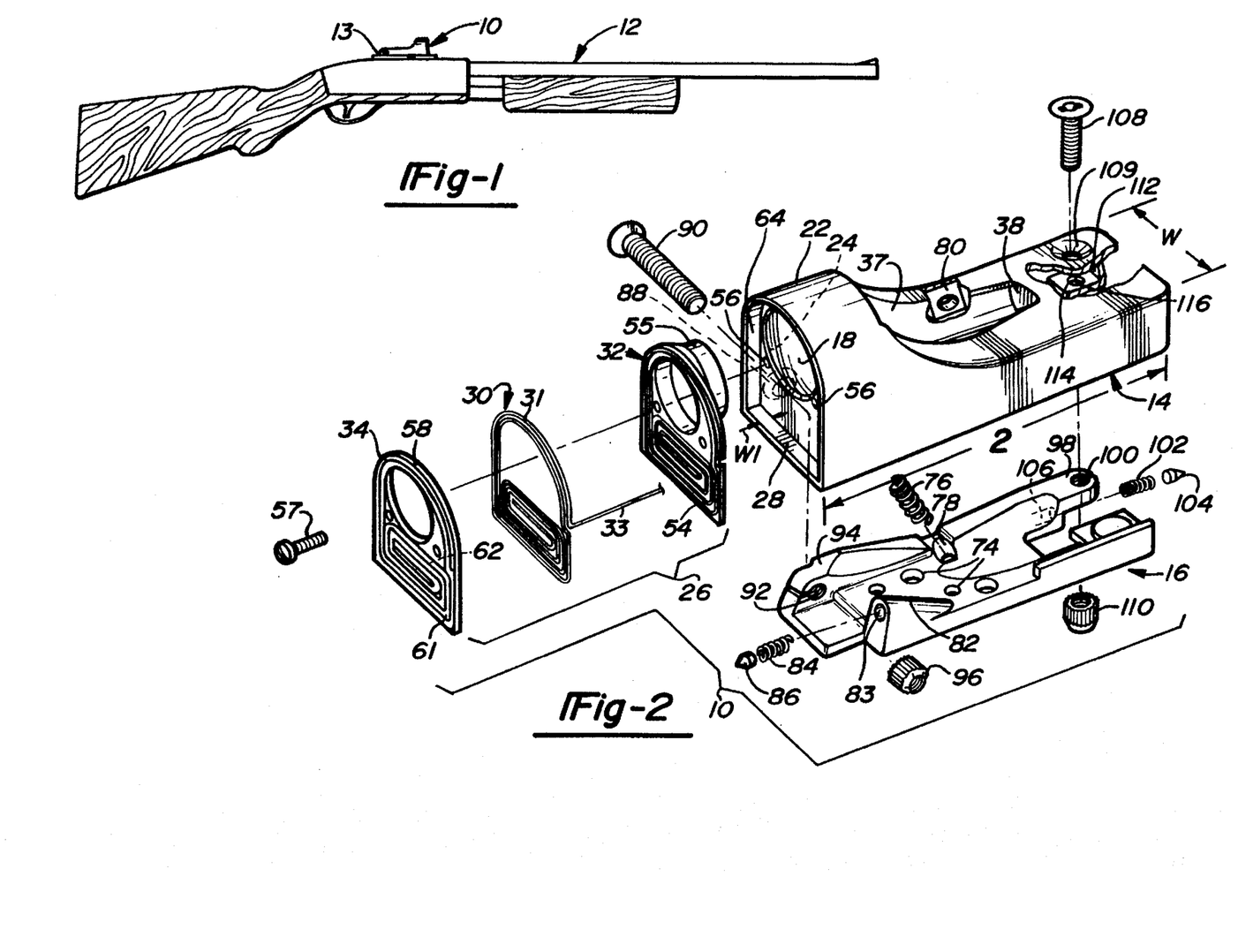
FIG. 1 is a side elevational view of a rifle with the sighting device of the present invention mounted thereon.
FIG. 2 is an exploded pictorial view depicting various components of the unique sighting device including the housing, base, and a light collector assembly comprising a fiber optic light collector, a light collecting lens and a retainer.

Looking now to the drawings, the reflex sighting device of the present invention is depicted as a gun sight 10 adapted to be mounted on a rifle 12 via a mounting bracket 13. The gun sight or sighting device 10 includes a generally elongated housing 14 and a base 16. A dichroic mirror or lens 18 having a circular outer contour is mounted in a mating circular through bore 20 located in a raised front portion 22 of the housing 14. The dichroic mirror 18 is held in one axial direction by a reduced diameter, coaxial shoulder 24. A light collector assembly 26 is adapted to be located in a cavity 28 at the forward end of the housing 14 and comprises a fiber optic structure 30, a retainer 32 for supporting the structure 30 and a light collecting lens 34.

Figures 5, 6:
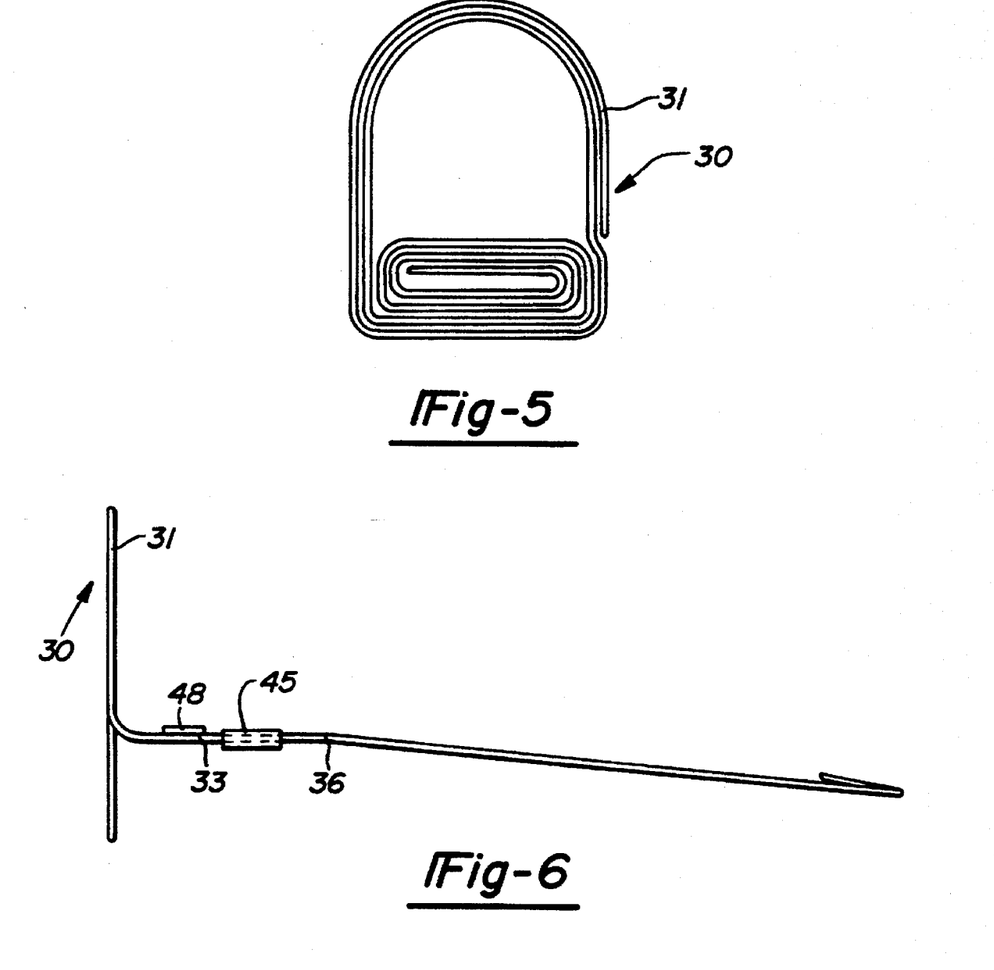
FIG. 5 is a front elevational view of the fiber optic light collector of the sighting device of FIGS. 3 and 4.
FIG. 6 is a side elevational view of the fiber optic light collector of FIG. 5.
Figure 11:
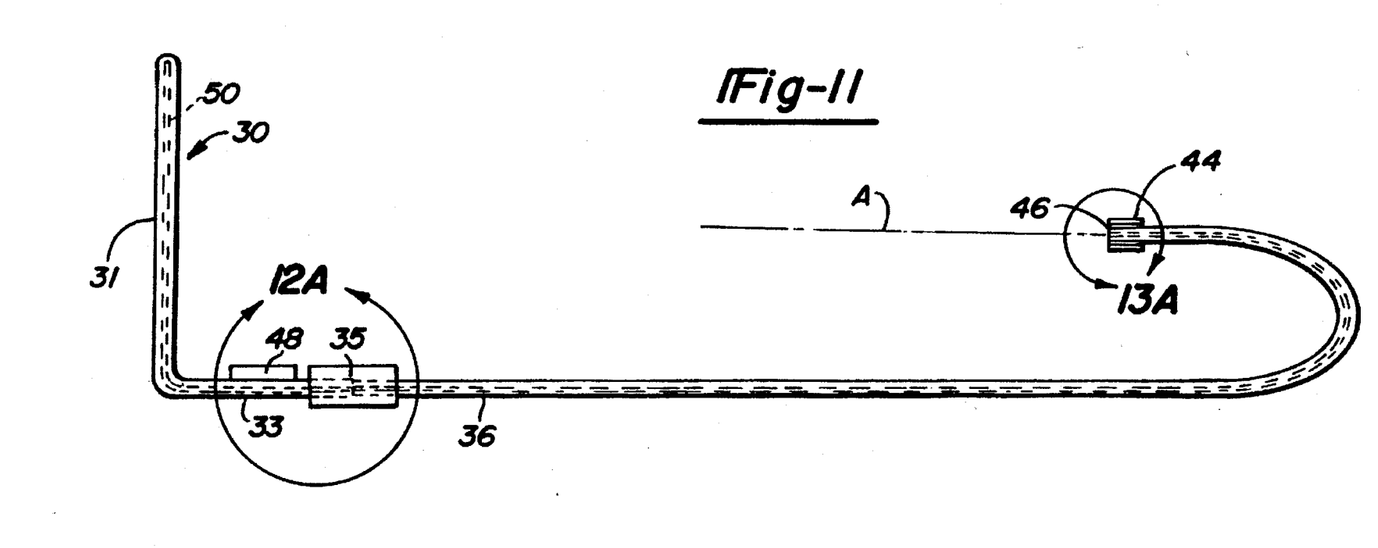
FIG. 11 is a plan view taken generally from the top of one form of optical circuit as shown in FIG. 6, including the fiber optic light collector, radio-luminescent source, related fiber optic transmission line and coupling between the light collector and transmission line.
Figure 12:
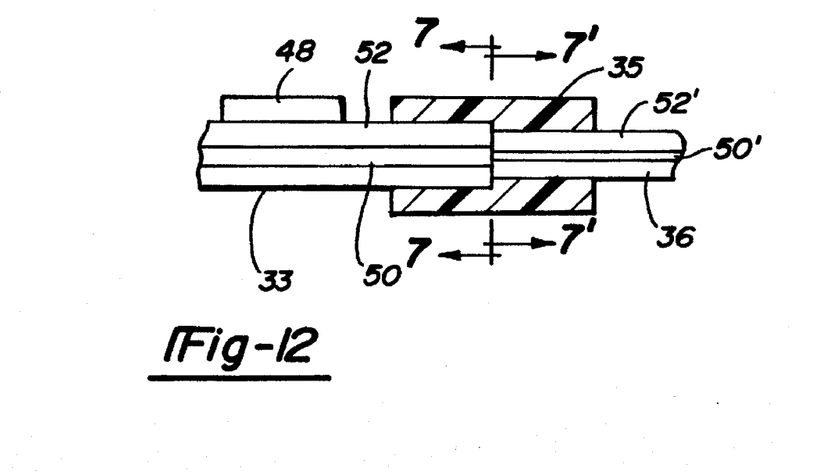
FIG. 12 is a fragmentary, sectional view to enlarged scale of the coupling between the collector section and transmission line taken generally in the area of the circle 12A in FIG. 11.
Figure 13:
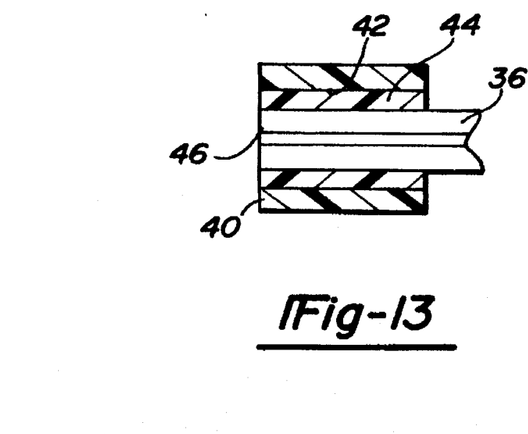
FIG. 13 is a fragmentary, sectional view to enlarged scale of the reticle defining end of the fiber optic line taken generally in the area of the Circle 13A in FIG. 11.

The fiber optic structure 30 includes a fiber optic light collector section 31 and a separate fiber optic transmission line 36 which is connected therewith to an end fiber line 33 by way of a fiber optic coupling 35 of a known construction (see FIGS. 6, 11 and 12). The use of a transmission line 36 separate from the collector section 31 serves a purpose to be described. Thus the ambient light captured by the collector section 31 is transmitted through the housing 14 by the fiber optic transmission line 36. Looking now to FIGS. 3 and 4, it can be seen that the fiber optic transmission line 36 extends substantially through the housing 14 to its rearward end. The housing 14 has a longitudinal, generally arcuate, concave slot 37 in its upper surface which extends from an enlarged contour at the through bore 20 and the dichroic mirror 18 and tapers to a reduced size at an opening 38 proximate the rearward end of the housing 14. The slot opening 38 communicates with the inside of the housing 14. An inner wall 40 is located on the inside of the housing 14 in a location spaced rearwardly of the slot opening 38 (see FIGS. 3 and 4). The free end of the transmission line 36 is adapted to be supported in a bore 42 in the inner wall 40 in confrontation with the slot opening 38 (see FIGS. 3 and 13). A supporting ring 44 is located about the end of the transmission line 36 and is adapted to secure that end in the bore 42 (see FIG. 13). At the same time the exposed end face 46 of the transmission line 36 is located to be facing the dichroic mirror 18 through the slot opening 38 to transmit the light emanating therefrom to the dichroic mirror 18 along the line A (see FIGS. 4 and 11).

Figure 7:
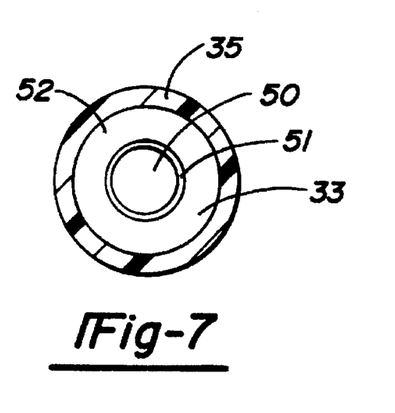
FIG. 7 is an end view to increased scale of the connecting end of the fiber optic strand of the collector section as taken in the direction of the Arrows 7—7 in FIG. 12 with the transmission line having a similar shape when taken in the direction of the Arrows 7'—7' with the reticle pattern being defined by the circular dot of the end face of the transmission line as shown.

Looking now to FIG. 7 the fiber optic collector section 31 and the associated transmission line 36 are constructed of optical fibers having a core portion 50, 50' and an outer casing 52, 52'. In the embodiment of the present invention as shown, the reticle pattern is defined by the shape of the core portion 50' at the exposed end face 46 (see FIG. 11) of the transmission line 36 which can be a circular dot as shown in FIG. 7. The dichroic mirror 18 is arcuately contoured in a manner well known in the art to reflect the reticle pattern back to the eye of the operator along the line B which is essentially in coincidence with the sight line of the operator.

In coupling the end fiber line 33 to the confronting end of the transmission line 36, the fiber of the transmission line 36 including the casing 52' and core portion 50' are provided to be of a slightly smaller diameter than casing 52 and core portion 50 of the collector section 31 and hence of the fiber line 33. This facilitates alignment of the slightly smaller core portion 50' of the transmission line 36 with the core portion 50 of the end fiber line 33 whereby the light transmitted can be optimized. This also facilitates use of a diamond shaped core portion 50' on the transmission line 36 to define the dot or reticle pattern at the end face 46 with the collimator section 31 having a fiber of a simpler construction with a slightly larger circular core portion 50. Here also the difference in diameters facilitates the effective transmission of collected light from the larger circular core portion 50 to the smaller diamond shaped core portion 50'.

Thus the light collector section 31 will provide illumination to the exposed end face 46 of the fiber optic line 36 via the fiber line 33 whereby an illuminated reticle pattern will be provided to the viewer or operator. At the same time the intensity of illumination or brightness of the light emitted from the end face 46 and hence of the reflected reticle pattern will vary as a function of the level of intensity of the ambient light.

In order to provide illumination from the end face 46 during night sighting a radio-luminescent source or tritium lamp 48 is optically connected to the fiber optic transmission line 36 via the fiber line 33 within the housing 14 at a location proximate to the coupling 35 (see FIGS. 6, 11 and 12). As noted the tritium lamp 48 will provide a level of illumination to the end face 46 significantly lower than the maximum intensity provided by the fiber optic collector section 31 at peak daylight sighting. Thus as the intensity of ambient light decreases the desired degree of contrast between the intensity of illumination of the reticle and the illumination of the object will be automatically maintained. In one form of the invention the tritium lamp 48 was of the type T-4734 manufactured and sold by M B Microtec.

Looking now to FIGS. 7 and 11, the fiber optic collector section 31 is constructed of an optical fiber preferably made with the core portion 50 constructed of a pigmented fluorescent polystyrene material having a refractive index of around 1.592 with an outer cladding 51 of a clear acrylic material having a refractive index of around 1.492. In another form of the invention the same pigmented fluorescent polystyrene core portion 50 is first covered with a fluoropolymer cladding 51 with a refractive index of around 1.408. The core portion 50 with its cladding 51 is then surrounded with the outer casing 52 of clear polystyrene material. It should be understood that optical fibers of different constructions could be utilized including core portions, such as portion 50, of different light activated material.

Figure 8:
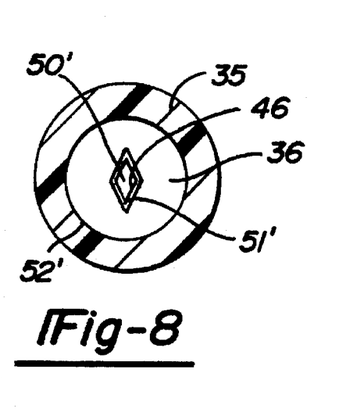
FIG. 8 is an end view to increased scale of a different reticle pattern which is a diamond dot as defined by the end face of the fiber optic of the transmission line and as would be taken in the direction of the Arrows 7'—7' in FIG. 4.

The optical fiber of the transmission line 36 is constructed similarly to that as shown in FIG. 7 and as described above with reference to the collector section 31 except that the core portion 50 is constructed of a non pigmented clear acrylic material having a refractive index of around 1.492. As noted, in the form of the invention of FIGS. 2–7 and 11–13, the core portion 50 of the transmission line 36 defines the shape of the reticle pattern which as shown will be a circular dot (FIG. 7) or a diamond dot (FIG. 8).

With the core portion 50 of the fiber optic of the collector section 31 made of a colored or pigmented fluorescent fiber, the ambient light impinging on the fiber optic collector section 31 will excite the fluorescent material to generate light for illuminating the reticle pattern. In one form of the invention the diameter of the core portion 50 of the optic fiber was around 0.0057 inches (0.144 mm) while the major diameter of the optic fiber was around 0.0255 inches (0.65 mm). A suitable fiber material can be generally of the type manufactured and sold by Opectron under the designation F204. As noted the optical fiber of the transmission line 36 will have slightly smaller dimensions, i.e. around 10% less than that of the collector section 31 and hence of the fiber line 33.

Figures 3, 4:
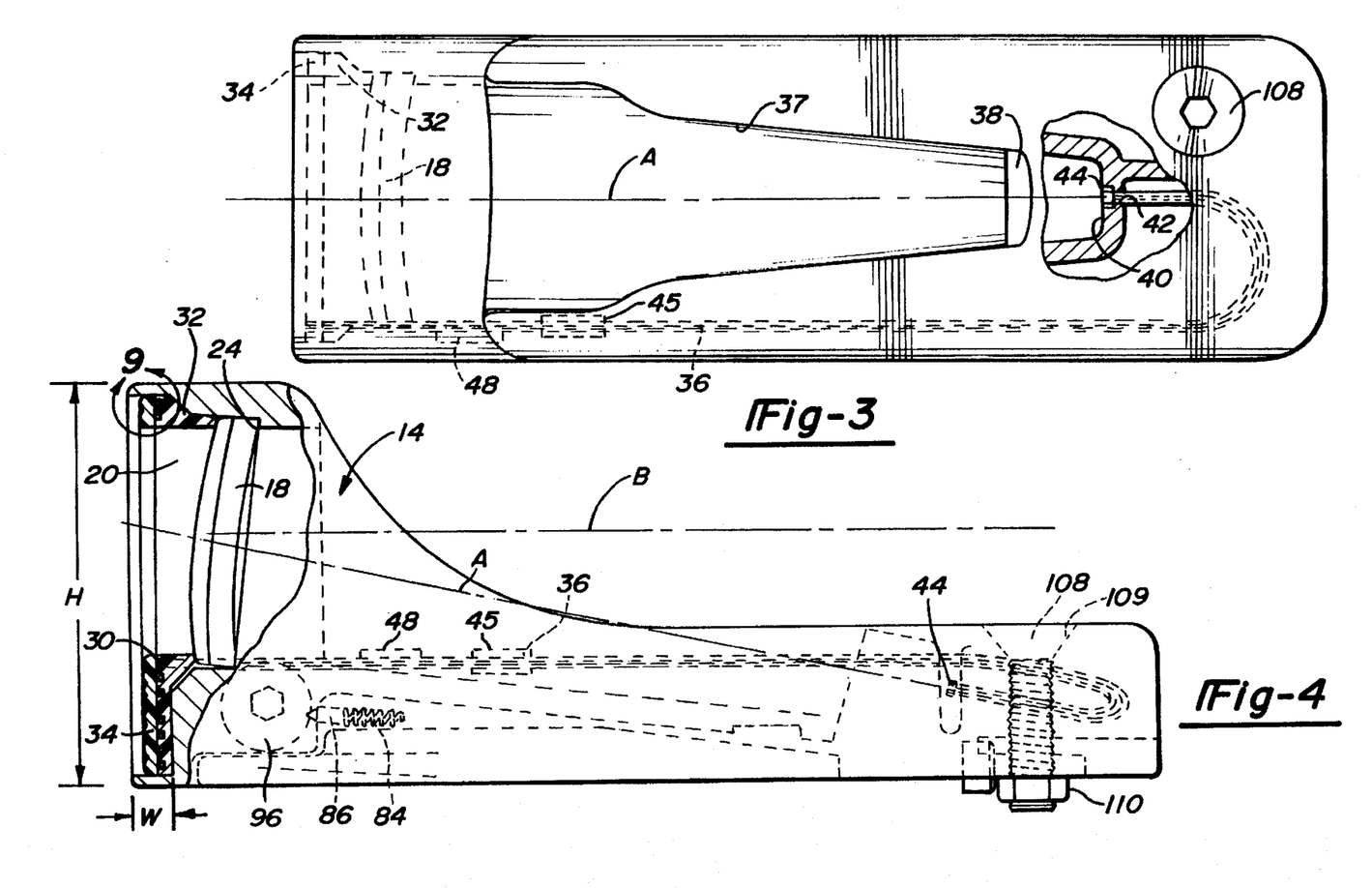
FIG. 3 is a top elevational view of the sighting device of the present invention with one portion broken away and partially shown in section.
FIG. 4 is a side elevational view of the sighting device of FIG. 3 with the front end shown partially broken away and in section, and partially depicting the assembly of the fiber optic light collector, light collecting lens, and dichroic mirror.

As can be seen from FIGS. 3 and 4, the fiber optic transmission line 36 is not exposed to ambient light as is the collector section 31. Instead the line 36 passes in the internal shadow of the main housing 14. If the core portion 50' of the transmission line 36 were constructed of a pigmented fluorescent material as is the optical fiber of the collector section 31, then the light traveling through the fiber optic line 36 in the housing 14 could experience some loss in intensity resulting from such fluorescent treatment. Thus in the embodiment shown in FIG. 11, the separate transmission line 36 is constructed with a clear core portion 50' whereby such losses are avoided.

The construction described above serves to efficiently provide a reticle pattern of a desired size for the chosen focal length of the dichroic mirror or lens 18. In a preferred embodiment of the present invention, the focal length of the dichroic mirror or lens 18 was around 3.00 inches (76.2 mm). By the application of calculations through methods known to those skilled in the art, it was determined that a suitable reticle dot size of 6.5 MOA (minutes of angle) will be subtended on the target or scene being viewed at the dichroic lens 18. Thus the shape and size of the core portion 50' of the transmission line 36 defines the final reticle shape and size in the embodiments of the invention as noted above.

As can be seen from FIGS. 2 and 5, the fiber optic collector section 31 is arranged in a generally serpentine configuration defined by a series of coils of increasing size. The desired shape of the collector section 31 can be preformed by known processes. For example a selected length of generally straight fiber optic material can be formed into the desired serpentine shape by immersing it in water at around 212° F. or 100° C. and then, while in a plastic state, bending it to the desired shape on a suitable mold. When cooled the desired serpentine shape will be maintained. However since the details of that process do not constitute a part of the present invention such details have been omitted for purposes of simplicity.

The fiber optic collector section 31 in its preferred serpentine shape can then be located in a similarly shaped groove 54 in the outer face of the retainer 32. The retainer 32 has an outer contour generally matching that of the cavity 28 and is adapted to be received therein and has an annular shoulder 55 adapted to engage the outer circular edge of the dichroic mirror 18 to support the mirror 18 in the cavity 28 against the shoulder 24.

Figure 9:
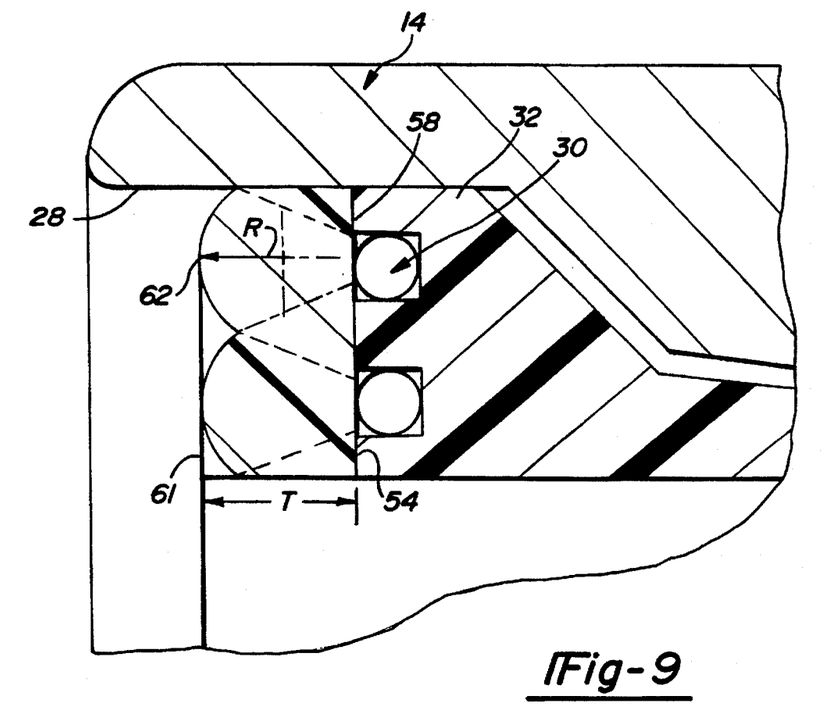
FIG. 9 is a fragmentary view to enlarged scale depicting the assembly of the fiber optic light collector, light collecting lens and retainer generally in the area of the Circle 9A in FIG. 4.

In order to improve the efficiency of the fiber optic collector section 31 and hence to maintain its exposed length at a minimum, the ambient light is focused radially inwardly or transversely into the coils of the collector section 31 by the light collecting lens 34. Looking now to FIGS. 2, 9 and 10 it can be seen that the collecting lens 34 has a peripheral contour generally matching that of the retainer 32 and hence of the cavity 28 and is adapted to be located therein. The collector assembly 26 then can be fixed in the cavity 28 by a pair of screws, such as screw 57, extending through aligned mounting openings in the retainer 32 and collecting lens 34 and into threaded bores 56 in the end wall of the cavity 28.

Figure 10:
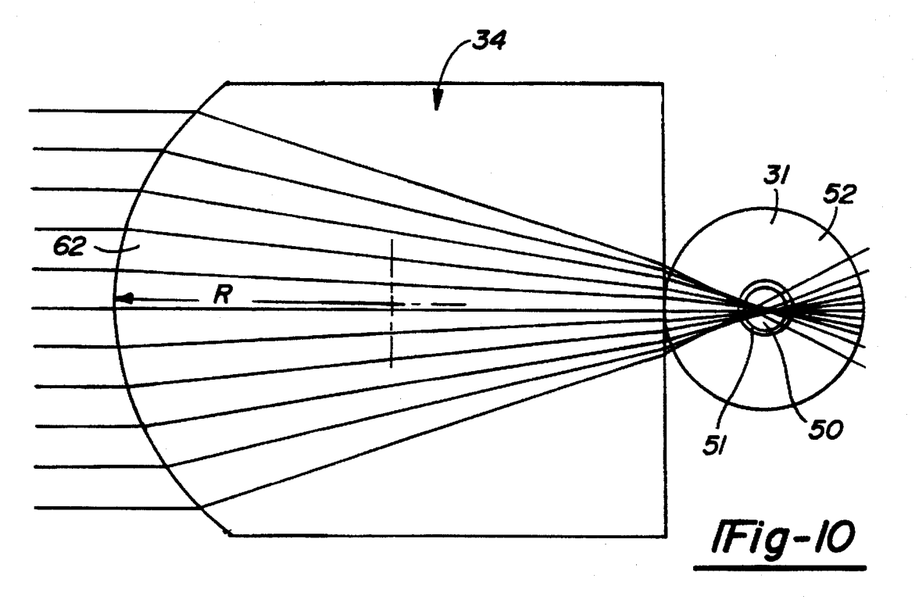
FIG. 10 is a diagram to enlarged scale of the light collecting lens of FIGS. 2 and 9 generally illustrating the focusing of the ambient light rays radially into the associated portion of the fiber optic light collector.

The collecting lens 34 has a generally flat or planar inner surface 58 adapted to engage the outer surface of the coils of the collector section 31 when located in the groove 54 in the retainer 32. The axially outer surface 61 of the collecting lens 34 is formed with a lens track 62 having a serpentine configuration matching that of the fiber optic collector section 31 and groove 54 in retainer 32. The lens track 62 has as an arcuate shape defining a convex lens with a curvature adapted to collect the impinging ambient light and focus it radially inwardly through the transparent outer casing 52 and into the fluorescent treated core portion 50 of the confronting coils of the fiber optic collector section 31. In this regard the aligned mounting openings in the retainer 32 and collecting lens 34 along with the matching peripheral contours with cavity 28 provides the necessary alignment between the serpentine shape of the lens track 62 and that of the collector section 31. In one form of the invention the lens track 62 was generally cylindrical in shape with an outer arcuate surface having a radius of curvature R of around 0.0391 inches (0.992 mm). The collecting lens 34 can be made of a transparent or clear polycarbonate material. A thin silicone hard coating of around 0.00016 inches (0.004 mm) thick with a refractive index of around 1.43 can be applied to the outer surface 61 to protect it from the elements. The thickness T of the collecting lens 34 can be around 0.0745 inches (1.89 mm) (see FIG. 9). The polycarbonate material of the collecting lens 34 can be of the type manufactured by General Electric and sold under the designation of Lexan QQ 2220 with a refractive index around 1.586. The curvature of the transparent outer casing 52 of the optical fiber also acts as a lens which can affect the transmission of light rays to the core portion 50. Thus the lens defined by the lens track 62 is advantageously selected to direct the light rays into the optical fiber at an angle of incidence which will be compatible with the curvature of the casing 52 of the optical fiber such that the collected light is focused into the core portion 50. With the configuration, construction and dimensions as described, an optical light path diagram as illustrated by FIG. 10 indicates that light in the vicinity of the target area and up to a generally conical or radial angle of around ±5 degrees, relative to the center of the aiming or viewing axis B, will be radially directed into the fluorescent core portion 50 of the fiber optic collector section 31. The lines Shown in FIG. 10 are examples of light rays impinging generally directly on the light collector section 31. As noted light rays at angles up to about plus or minus 5 degrees will also pass into the fluorescent pigmented core portion 50 of the fiber optic collector section 31. Thus the preceding embodiment of the present invention is sensitive to light in the vicinity of the target or scene as viewed by the operator. This is enhanced by the fiber optic collector section 31 and associated collecting lens 34 being contoured and located to generally surround the dichroic mirror 18 and hence surround the scene being viewed along the aiming or viewing axis B.

In this regard it should be noted that the coils of the fiber optic collector section 31, are generally located in a single, generally unidirectional plane, i.e. within a common generally smoothly, continuously contoured envelope such as defined by a flat plane. This arrangement not only contributes to the response to light in the area of the target or scene to be viewed but also facilitates the construction and operation of the associated collecting lens 34 for focusing the light. In some applications an arcuate or generally, partially spherical plane could be used While it is believed that the embodiment as shown and described has numerous advantages for certain applications, such as for gun sights, it should be understood that other, modified designs for different applications could advantageously utilize these principles of light collection; for example designs could be made which were responsive to a much wider angle of ambient light or to ambient light in a different direction, such as the wide angle of the sky above the aiming or viewing axis B of the sighting device 10.

With the collecting lens 34 in combination with the fiber optic collector section 31 as shown, the amount of light generated by excitation of the fluorescent treated fiber optic core portion 50 of the collector section 31 can be significantly increased whereby the light transmitted can be maximized permitting the overall length of the collector section 31 to be minimized while still providing the desired level of illumination at the end face 46 of the transmission line 36 which end face defines the reticle pattern.

As previously described and as can be seen in FIG. 7 the reticle pattern as defined by the core portion 50' at the end face 46 of the transmission line 36 will be a circular dot. A different shaped reticle pattern could be obtained by providing the transmission line 36 to have a diamond shaped core portion 50', as shown in FIG. 8, which would be illuminated by the collector section 31 having the circular core portion 50 as shown in FIG. 7.

In one form of the invention the length of the serpentine portion of the fiber optic collector section 31, which is exposed to ambient light at the front of the housing 14, was around 13 inches (33 cm). In this regard, the cavity 28 housing the collector assembly 26 had a width W1 of around 1.195 inches (30.35 mm) and an overall height H of around 1.545 inches (39.24 mm) with the radius of curvature of the roof portion 64 being around 0.598 inches (15.19 mm). The width W2 of the housing 14 was around 1.34 inches (34.04 mm) while the overall length L was around 4.20 inches (106.7 mm).

The retainer 32 is constructed from a black, non-light reflecting material. In one form of the invention the retainer 32 was constructed of a carbon fiber filled thermo-plastic material sold by the General Electric Company under the designation Ultem 7801 with the retainer 32 having a matte black finish.

In addition to providing a desired contrast in intensity between the brightness of the reticle and that of the viewed image or target, a contrast in color is also desirable. It is believed that for day and night sighting a reticle pattern having an amber or orangish hue is advantageous. Thus in one form of the present invention the optical fiber of the core portion 50 of the collector section 31 was treated with a yellow fluorescent material which resulted in a reflected reticle pattern from the dichroic mirror or lens 18 of an amber or orangish hue for day sighting. At the same time the tritium lamp 48, having a green hue, causes, by fluorescence from the optical fiber of the collector core portion 50, the same amber color to appear in the reticle as viewed at night. Thus for day or night sighting the combination of the dominant yellow light from the fiber optic collector 30 and the wavelength of the dichroic mirror 18 will provide a reflected reticle pattern having an amber or orangish hue. For night sighting, with substantially no daylight illumination on the light collector section 31, the reticle pattern will still have an amber or orangish hue.

Keeping the preceding in mind, the beam-splitting dichroic mirror or lens 18 is provided with a selective coating by which it is reflective over a certain range of wavelengths and transmissive over another range. In this particular case, the coating was selected to reflect light at a wavelength of from about 570 nm and higher and to transmit light of a wavelength below that level. In other words the blue hues will be transmitted while the red hues will be reflected. The operator or viewer, looking through the sighting device 10 at the object or scene with only one eye, will see the latter in a slightly bluish tint. The outer surface of the dichroic mirror 18 can be provided with an antireflex coating to reduce losses.

In some constructions it may be desirable to make the fiber optic structure 30 from a one-piece, continuous optical fiber for the collector section 31 and the transmission line 36. Such an embodiment is shown in FIGS. 14 and 15 where components similar to like components in the embodiment of FIGS. 6 and 11 are given the same numeral designation with the addition of the letter postscript "a".

Figures 14, 15, 16, 17:
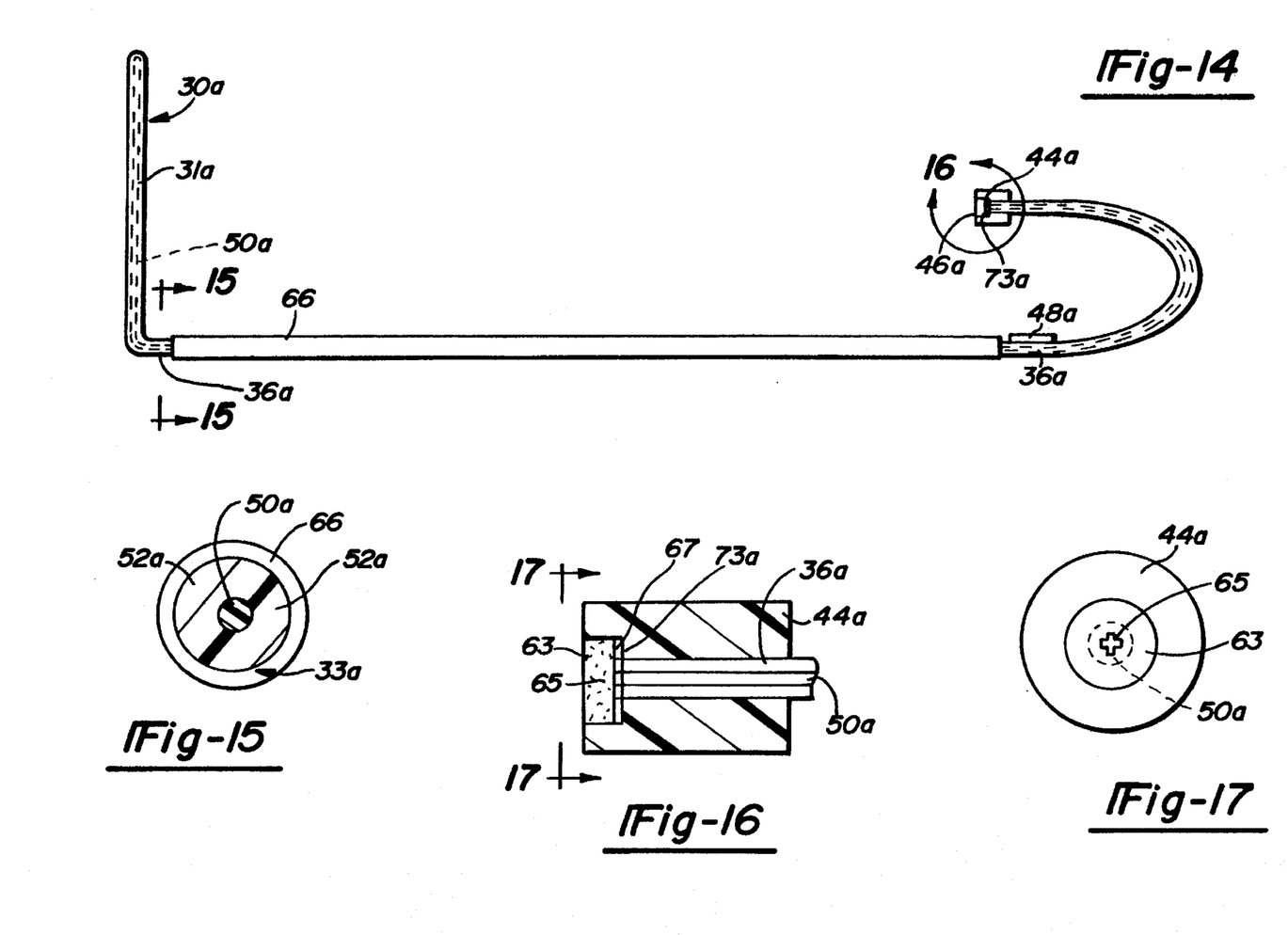
FIG. 14 is a plan view, similar to that of FIG. 11, of a modified form of the optical circuit of FIG. 11 including an integral fiber optic light collector and fiber optic transmission line and a radio-luminescent source.
FIG. 15 is a sectional view to increased scale of a different fiber optic line as taken in the direction of the Arrows 15—15 in FIG. 14.
FIG. 16 is a fragmentary view to enlarged scale of the reticle defining structure at the end of the fiber optic line taken generally in the area of Circle 16A in FIG. 14.
FIG. 17 is an end view to enlarged scale of the reticle defining structure of FIG. 16 taken generally in the direction of the arrows 17—17 in FIG. 16.

Thus in FIGS. 14 and 15, the light collector section 31a and transmission line 36a are constructed of a single, continuous optical fiber. Looking now to FIG. 15, the optical fiber includes a fluorescent core portion 50a and transparent outer casing 52a. However, no cladding is used around core portion 50a, such as cladding 51. A protective plastic RTV material 66 is applied to the transmission line 36a which acts to bond the line 36a to the adjacent inner wall of the housing 14 to thereby protect the line 36a from vibration. Looking now to FIG. 14, the tritium lamp 48a is optically coupled to the line 36a near its light emitting end. It should be understood that the protective RTV coating 66 could be used with a continuous optical pigmented fiber including the cladding 51 as shown in FIG. 7 and similarly can be applied to any of the embodiments described herein.

As noted in FIGS. 7 and 8, the reticle pattern is provided by the core portion 50 at the exposed end face 46 of the fiber optic transmission line 36. In this case, as mentioned above, the outer diameter or peripheral shape of the transmission line core portion 50 forms the size and shape of the reticle pattern or aiming mark seen by the operator in the target or viewing area. This is a desirable feature of the present invention since the user will observe a sharp outline of the reticle pattern in the target or viewing area. In some prior art devices, where a light emitting diode is placed behind a reticle mask consisting of a drilled hole, the aiming mark is not sharp, but is observed in the dichroic mirror to have a starburst and generally imprecise shape and outline. This is caused in part where an air space or gap occurs between the die of the light emitting diode and reticle mask and/or the end of the fiber optic and reticle mask which allows light to scatter. In these cases it is more difficult for the dichroic mirror to be accurately focused at the plane of the illuminated pattern. This can be avoided by the construction as shown in FIGS. 16 and 17 as adapted for use in the embodiment of FIGS. 14 and 15. Looking now to FIGS. 16 and 17, a flat glass element 63 with a reticle mask 65 on it, supported on the ring 44a, is flush against the end face 46a with the mask configured to provide the desired reticle pattern which can be in the form of the traditional cross-hairs as shown in FIG. 17. In this case the reticle mask 65 must have a clear aperture size and shape which is substantially, completely located within the confines of the fluorescent fiber core portion 50a. This structural arrangement will also avoid the starburst characteristic because the dichroic lens or mirror 18 can be focused on the aperture of the reticle mask 65 of glass 63 which is then fully illuminated by the flush mounted fiber optic core portion 50a through a proper numerical aperture. The inner surface 67 of the glass element 63 has a vacuum metalized, thin opaque coating which is etched to define the desired reticle pattern with the opaque coating blocking any other light therethrough from the end face 46a of the transmission line 36a. The thin opaque coating can be provided by vaporizing aluminum in a vacuum with the coating thickness being between around 500 Å to 1500 Å (Angstrom units).

Figure 18:
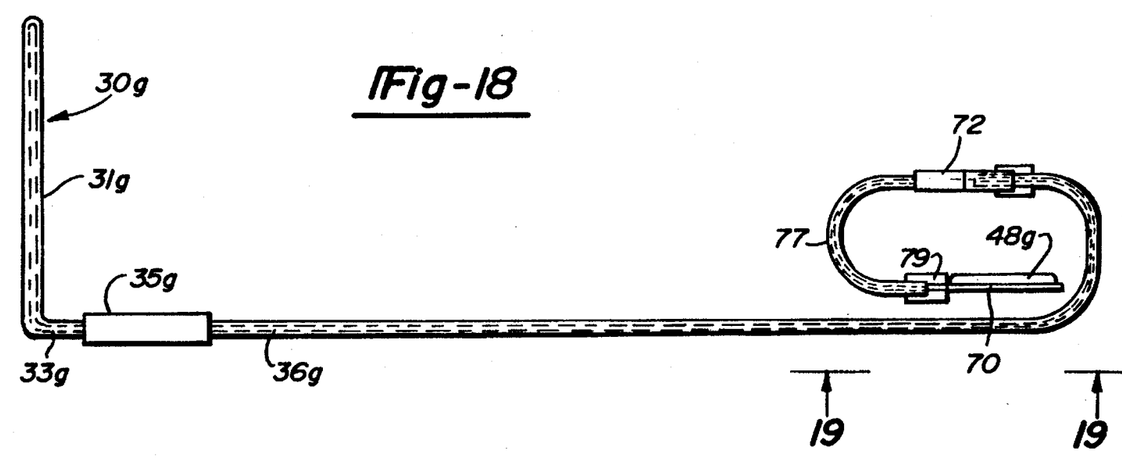
FIG. 18 is a plan view of still another modified form of the optical circuit of FIG. 11 including the fiber optic light collector, radio luminescent light and related fiber optic transmission lines.
Figure 19:
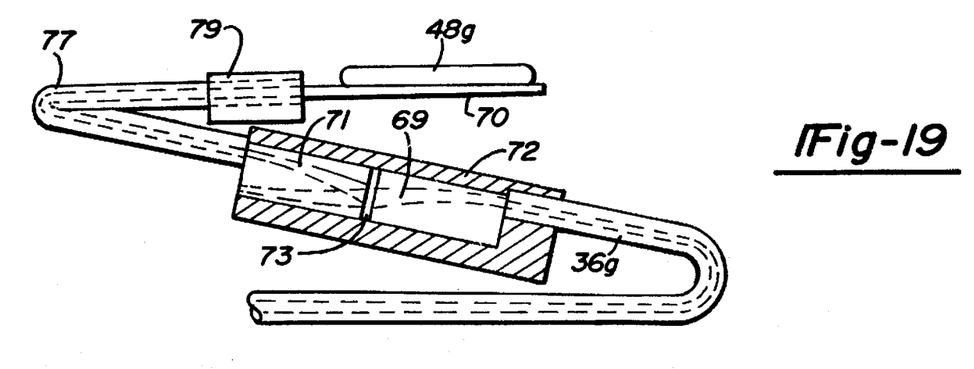
FIG. 19 is a fragmentary, partially sectioned view to enlarged scale of the optical circuit of FIG. 18 taken generally in the direction of the arrows 19A—19A in FIG. 18.

Another form of optical circuit for use in the present invention is shown in FIGS. 18 and 19. In the description of the embodiment of FIG. 18 components similar to like components of the prior embodiments will be given the same numeral designation with the addition of the letter postscript "b".

Looking now to FIGS. 18 and 19, the fiber optic structure 30b is constructed of the two piece fiber optic such as that shown in FIGS. 11 and 12; alternatively the structure 30b could be constructed of a single optic fiber such as in the fiber optic structure 30a shown in FIG. 14.

Thus the optical fiber of the collector section 31b will be of the type having a fluorescent, pigmented core while the optical fiber of the transmission line 36b will be of the type having a clear, non-pigmented core. As shown in FIGS. 18 and 19 the tritium lamp 48b can illuminate a short length of red fluorescent cored fiber optic material or line 70. The red light is brought to the forward end of a GRIN lens assembly 72 comprising a cemented pair of gradient index (GRIN) lenses 69 and 71. This can be done with or without a coupling 79 to a length of clear optical fiber 77. At the cemented interface between the two GRIN lenses, a suitable dichroic coating 73 is placed to selectively reflect red light but transmit amber light. Again a dichroic coating of 630 nm can be used. Thus the GRIN lens pair can combine the red image through reflection with the amber image by transmission and present a reticle pattern on the adjacent surface of the GRIN lens which is a combination of the day amber color and a red night color. Both the fiber optic transmission line 36b and the fiber optic line 70 can be interconnected by a coupling 72 to properly locate and superimpose the two images of the reticle pattern. The GRIN lenses 69 and 71 are of matching wavelengths of P/4, i.e. pitch/4. Couplings such as 35b, 72 and 79 for connecting optical fibers are well known in the art and hence the details thereof have been omitted for purposes of simplicity.

In the case of the GRIN lens assembly, the combined images form the reticle pattern on the exit face of the GRIN lens 71. As such, the proper size and shape must be provided at the two input faces of the GRIN lenses 69 and 71. Usually, these would be two circular dots of the same size, formed by the clear aperture of the respective optical fibers 36b and 77.

It is desirable to have an illumination intensity from the light collector assembly 26 and from the tritium lamp 48, to the end face 46 or reticle pattern to provide a desired contrast level to accommodate the wide variations in the illumination intensity or illuminance of day sighting and at the same time to accommodate night sighting.

In this regard it should be understood that the light intensity in daylight sighting can have extreme variations. For example, as the operator moves the sighting device from a brightly lit target area into a darkened or shaded area, the brightness, or illuminance of the scene being viewed can vary over a range of from about 1000 foot candles (FC) to around 0.1 foot candles (FC). These variations in light intensity can be automatically accommodated by the light collector assembly 26 of the present invention. For example, with the present invention as described, a substantially constant contrast ratio of between around 200 to around 250 and desirably around 230 has been achieved. In this regard, contrast ratio can be defined by the value of (DI−BI)/BI, where DI is the luminance of the reticle pattern as viewed in the dichroic mirror or lens 18 and BI is the luminance of the scene being viewed. For the purposes of the contrast ratio calculation, the illuminance values in foot candles are converted to units of luminance assuming the target scene is a Lambertian surface. This is required since the aiming dot is self-radiant. This assures that the reticle pattern will be clearly observable in viewing scenes at the upper end of illuminance while also providing that the reticle pattern will not wash out scenes being viewed at the lower end of illuminance.

Beginning at about 0.1 FC and into moonlight scenes at about 0.01 FC and even down to starlight at 0.001 FC, the present invention with illumination of the reticle pattern by the artificial tritium lamp 48 will maintain good contrast without washing out the background or target scene. This occurs, in part at least, because the amber color of the reticle pattern is presented to the dark adapted eye substantially in the center of the night blind spot. However, under some circumstances, such as operations where the operator is assisted with a passive night vision light amplification device, a significantly lower level of illumination from tritium is easily obtainable. In this case an opaque mask, which is selectively moveable between the tritium lamp and the fluorescent core material of the fiber optic line, can be utilized.

With the construction of the present invention then, visual washout of the scene being viewed by the illuminance of the reticle pattern on the dichroic mirror or lens 18 can be avoided over the extreme range of day sighting and through night sighting.

It should be understood that for sighting devices intended for daylight sighting only, the use of the artificial light source, such as tritium lamp 48 and associated circuitry, could be eliminated and any additional illumination required for day sighting could be readily provided with the construction of the present invention.

It is typical in sighting devices for rifles to provide means to calibrate the sighting device relative to trajectory of the bullet to compensate for windage and elevation. In the embodiment shown in FIGS. 1–10 of the present invention this is accomplished by a construction in which the housing 14 is selectively movable relative to the base 16.

Looking now to FIGS. 2–4, the base 16 is provided with a pair of threaded through bores 74 by which the sighting device 10 can be secured to the mounting bracket 13. A biasing spring 76 has one end located and held in a base seat 78 and the opposite end located and held in a housing seat 80. The base seat 78 and housing seat 80 are angulated at a common angle such that when the biasing spring 76 is located therein it is compressed in assembly and will be exerting a bias on the housing 14 urging it upwardly and outwardly (to the left as viewed in FIG. 2) relative to the base 16.

The base 16 has an outboard rib 82 with a longitudinally extending bore 83. A coil spring 84 is adapted to be located in the bore 83 in compressive engagement with a detent plunger 86. The housing 14 has a countersunk bore 88 adapted to receive a left-right adjustment screw 90 having a mating countersunk head. The threaded shank of the screw 90 extends into the housing 14, through a threaded bore 92 in a rib 94 located on the side of the base 16 opposite from the rib 82. A ratchet nut 96 is threadably, fixedly secured to the end of the shank of the left-right screw 90 at a position in line with the detent plunger 86. The ratchet nut 96 has its outer surface axially knurled or splined. Thus, when assembled, the detent plunger 86 will be urged into engagement with the splines of the ratchet nut 96. To make a left-right or windage adjustment of the sighting device 10, the screw 90 is simply threaded more or less into the bore 92 with the bias of the biasing spring 76 urging the housing 14 in the desired direction relative to the base 16. The ratchet nut 96 will rotate with the adjustment screw 90 to provide a feel for the indexing movement and an audible or tactile "click" sound or feedback to the operator caused by the ratcheting movement of the detent plunger 86. A sufficient number of splines are provided on the ratchet nut 96 to permit the slight left-right adjustments by indexing between adjacent splines. In one form of the invention forty such splines were located at generally equal intervals over the circumference of ratchet nut 96. The engagement of the detent plunger 86 with the splines on the ratchet nut 96 will also provide an anti-rotation function to hold the housing 14 and base 16 in the desired relative position.

A similar structure can be utilized for adjustment of elevation. Thus the base 16 has an arm portion 98 extending longitudinally, rearwardly from one side. A threaded bore 100 extends generally vertically through the arm portion 98.

A coil spring 102 and detent plunger 104 are identical to spring 84 and plunger 86 and are similarly located in a bore 106 extending into the base 16 at a position below and forwardly of the arm portion 98. An up-down or elevation adjustment screw 108, identical to screw 90, extends into housing 14 through a countersunk bore 109 and in threaded engagement with the threaded bore 100 in arm portion 98. The arm portion 98 is adapted to fit in a notch 112 located at the rearward end of the housing 14. A lower plate portion 114 of notch 112 has a through bore 116 adapted to receive the outer end of the shank of adjustment screw 108 in clearance relationship. A serrated ratchet nut 110, identical to ratchet nut 96, is threadably, fixedly secured to the outer end of the shank of adjustment screw 108. The ratchet nut 110 is spaced from the plate portion 114 and located in a position to be engaged by the detent plunger 104 which is below the plate portion 114. To make an up-down or vertical adjustment for elevation, the screw 108 is simply threaded more or less into the threaded bore 100 whereby the back of the housing 14 will be pivoted vertically about the left-right adjustment screw 90 to the desired position. The bias of the biasing spring 76 will urge the housing 14 to the desired vertical position relative to the base 16. Again the ratchet nut 110 will rotate with the adjustment screw 108 and to provide a feel for the indexing movement and an audible or tactile "click" to the operator for each increment of rotation. The serrations on the ratchet nut 110 as engaged by the detent plunger 104 will provide a positive locking action.

It should be noted the total amount of movement both for the windage calibration via the left-right adjustment screw 90 and for elevation calibration via the elevation adjustment screw 108 is slight, i.e. generally around 0.05inches (1.27 mm) for windage and around 0.05 inches (1.27 mm) for elevation. This slight movement provides at least around ±45 MOA of windage and elevation adjustment. However, both of the threaded bores 92 and 100 are radially slotted to minimize binding with the associated screws 90 and 108 resulting from adjustment.

It can be seen that by locating the collector assembly 26 with collector section 31 and collecting lens 34 at the front end of the housing 14 of the sighting device 10, the level of ambient light utilized will be more nearly representative of the illumination level of the object or scene being viewed. Thus the desired contrast will be provided with the object or scene being viewed with the effect, if any, of the illumination of the surrounding area being minimized. As previously noted, this is enhanced by the fiber optic collector section 31 and associated collecting lens 34 being contoured and located to generally surround the dichroic mirror 18 and hence surround the aiming or viewing axis B.

Also by providing a light gathering means, such as the fiber optic collector 30, capable of receiving a significant quantity of ambient light energy in combination with the tritium lamp 48 a desired level of brightness of the reticle pattern can be provided substantially over the full range of light intensity from daylight, to twilight, to night and dawn.

In one form of the invention, the retainer 32 could be provided with a reflective surface in confrontation with the light collector section 31 and the collecting lens 34. In this case the collecting lens 34 could have its outer radius and other optical characteristics suitably revised so that light rays which do not intersect the fluorescent core of the fiber can strike a mirror reflective surface. This mirror surface could be a first surface mirror, or an internally reflecting mirror in combination with other molded clear plastic lens elements of the Mangin type. The mirror design would reflect light rays that miss the fluorescent core on the first passage and are thus reflected and focused into the fluorescent core portion 50. This structure could be utilized in the embodiments previously illustrated by providing the retainer 32 with a reflective surface constructed of aluminized Lexan.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A sighting device for day and night use for viewing a scene or object along a sighting axis, comprising:

reticle structure means for providing a reticle pattern for use in aiming said sighting device, a first source of light being a means for receiving ambient light;

a second source of light being a source of artificial light;

said first source of light comprising light collector means including a fiber optic light collector defined by an optical fiber having a preselected length and adapted to receive light directed radially inwardly into said optical fiber over said preselected length to provide a determinable level of illumination to said reticle structure means for providing a desired level of brightness for said reticle pattern for a desired contrast with the level of illumination of the image or object being viewed;

a fiber optic line operatively connected with said fiber optic light collector, said fiber optic light collector providing illumination to a light emitting end of said fiber optic line;

fiber optic means connected with said second source of light for providing illumination to said light emitting end of said fiber optic line;

and beam-splitting means comprising a non-telescopic, dichroic mirror operative for reflecting wavelengths of light over a first range and for transmitting wavelengths over a second range; said dichroic mirror having a central axis generally located in line with the sighting axis whereby the scene or object is viewed through said dichroic mirror;

said reticle structure receiving illumination from said light emitting end within said first range of wavelengths and projecting said reticle pattern onto said dichroic mirror to produce a reflected image of said reticle pattern superimposed on the image or object being viewed;

said light collector means comprising a lens structure operatively connected with said fiber optic light collector for focusing ambient light radially inwardly into said optical fiber generally over said preselected length.

2. The sighting device of claim 1 with said light emitting end of said fiber optic line substantially defining the shape of said reticle pattern.

3. The sighting device of claim 1 including fiber optic means for providing illumination to said reticle structure from said second source of light.

4. The sighting device of claim 3 with said fiber optic means providing illumination from said first and second sources of light to said light emitting end of said fiber optic line.

5. The sighting device of claim 4 with said light emitting end of said fiber optic line substantially defining the shape of said reticle.

6. The sighting device of claim 5 with said dichroic mirror in said first range reflecting wavelengths of light of around 570 nm. and higher and in said second range transmitting lower wavelengths of light.

7. The sighting device of claim 6 with said source of artificial light being a radio-luminescent source.

8. The sighting device of claim 1 with said optical fiber of said fiber optic light collector having a core portion and an outer cladding, said core portion including a light activated material to provide illumination at a preselected wavelength within said first range in response to the ambient light, said cladding being generally transparent to permit ambient light to pass radially therethrough to impinge upon the light activated material of said core portion, said lens structure being adapted to focus the ambient light radially into said core portion.

9. The sighting device of claim 1 with said optical fiber of said fiber optic light collector having a core portion and an outer cladding, said core portion including a light activated material to provide illumination at a preselected wavelength within said first range in response to the ambient light, said cladding being generally transparent to permit ambient light to pass radially therethrough to impinge upon the light activated material of said core portion, said lens structure being adapted to focus the ambient light radially into said core portion, said source of artificial light being a radio-luminescent source, said fiber optic line being constructed of substantially the same light activated material as said fiber optic light collector, said fiber optic means coupling said radio-luminescent source substantially directly onto said fiber optic line for transmitting light from said radio-luminescent source to said light-emitting end.

10. The sighting device of claim 9 with said reticle structure including a mask having said reticle pattern with said mask connected to said light-emitting end of said fiber optic line.

11. The sighting device of claim 1 with said optical fiber of said fiber optic light collector having a first core portion and a first outer cladding, said first core portion including a light activated material to provide illumination at a preselected wavelength within said first range in response to the ambient light, said first cladding being generally transparent to permit ambient light to pass radially therethrough to impinge upon the light activated material of said first core portion, said lens structure being adapted to focus the ambient light radially into said first core portion, said source of artificial light being a radio-luminescent source, said fiber optic line being constructed of an optical fiber having a second core portion and a second outer cladding, said second core portion being substantially clear and without a light activated material, said fiber optic means coupling said radio-luminescent source to said fiber optic line through an optical fiber part having a core portion and an outer cladding with the core portion including a light-activated material.

12. The sighting device of claim 11 with said optical fiber part being a part of said optical fiber of said fiber optic light collector.

13. The sighting device of claim 11 with said reticle structure including a mask having said reticle pattern with said mask connected to said light-emitting end of said fiber optic line.

14. A sighting device for viewing a scene or object comprising: reticle structure means for providing a reticle pattern for use in aiming said sighting device, a light source actuated by ambient light, said light source comprising a fiber optic light collector defined by an optical fiber having a preselected length and adapted to receive ambient light directed radially inwardly into said optical fiber over said preselected length to provide a determinable level of illumination to said reticle structure means and creating a level of brightness for providing a desired contrast with the level of illumination of the image or object being viewed; and beam-splitting means; said fiber optic light collector providing illumination to said reticle structure means, said reticle pattern being projected onto said beam-splitting means to produce a reflected image of said reticle pattern superimposed on the image or object being viewed, said optical fiber of said fiber optic light collector having a core portion and an outer cladding, said core portion including a fluorescent material to provide illumination of a preselected wavelength in response to the ambient light, said cladding being generally transparent to permit ambient light to pass radially therethrough to impinge upon the fluorescent material of said core portion, a light collecting lens adapted to be located proximate to said fiber optic light collector and having a lens structure adapted to focus the ambient light radially into said optical fiber generally over said preselected length.

15. The sighting device of claim 14 including a source of artificial light, fiber optic means connected to said second source of light for providing illumination to said reticle structure means for providing illumination for said reticle pattern for night sighting.

16. A sighting device for day and night use for viewing a scene or object, comprising:

reticle structure means for providing a reticle pattern for use in aiming said sighting device, first light source means for receiving ambient light and for providing illumination from the ambient light to said reticle structure means for illuminating said reticle pattern;

second light source means comprising an artificial light source and for providing illumination from said artificial light source to said reticle structure means for illuminating said reticle pattern;

said first light source means comprising a fiber optic light collector defined by a first optical fiber having a preselected length and adapted to receive light directed radially inwardly into said first optical fiber over said preselected length to provide a determinable level of illumination to said reticle structure means for providing a desired level of brightness for said reticle pattern for a desired contrast with the level of illumination of the image or object being viewed;

fiber optic means operatively connected with said first and second light source means for transmitting the light obtained from said fiber optic light collector and from said artificial light source to said reticle structure means, beam-splitting means for transmitting light waves over a first range of wavelengths and reflecting light waves over a second range of wavelengths and adapted to receive the scene or object being viewed and to transmit the scene or object with light of a wavelength in said first range of wavelengths;

said first and second light source means and said fiber optic means operative for transmitting light of a wavelength in said second range of wavelengths;

said reticle structure means receiving illumination from said fiber optic means and projecting said reticle pattern onto said beam-splitting means to produce a reflected image of said reticle pattern within said second range of wavelengths superimposed on the scene or object being viewed and being transmitted by said beam splitting means within said first range of wavelengths, said first light source means comprising a lens structure operatively connected with said fiber optic light collector for focusing ambient light radially inwardly into said first optical fiber generally over said preselected length.

17. The sighting device of claim 16 with said fiber optic light collector being defined by a generally serpentine arrangement of said first optical fiber and located in a generally unidirectional plane.

18. The sighting device of claim 17 with said lens structure including a lens track having a serpentine shape substantially similar to said serpentine arrangement of said fiber optic light collector and located generally in confrontation therewith whereby the ambient light received will be focused generally over said preselected length of said first optical fiber.

19. The sighting device of claim 18 with said first light source means comprising a retainer having a groove structure having said serpentine arrangement of said first optical fiber and adapted to receive said first optical fiber and to support said first optical fiber to retain said serpentine arrangement.

20. The sighting device of claim 19 with said sighting device including a housing and including support means operatively connected with said housing for supporting said fiber optic collector, said lens structure and said retainer and said beam splitting means with a portion of said serpentine arrangement generally surrounding said beam splitting means.

21. The sighting device of claim 20 with said beam-splitting means being a dichroic mirror having a sighting axis for viewing by the operator and for directly receiving the scene or object being viewed along said sighting axis.

22. The sighting device of claim 21 with said dichroic mirror reflecting wavelengths of light of around 570 nm. and higher and transmitting lower wavelengths of light.

23. The sighting device of claim 18 with said first light source means comprising a retainer having a groove structure having said serpentine arrangement of said first optical fiber and adapted to receive said first optical fiber and to support said first optical fiber to retain said serpentine arrangement, said retainer having a reflective surface in confrontation with said first optical fiber for reflecting light into said first optical fiber.

24. The sighting device of claim 16 with said fiber optic means comprising a second optical fiber having a light emitting end, said light emitting end of said second optical fiber substantially defining the shape of said reticle pattern.

25. The sighting device of claim 24 with said beam-splitting means being a dichroic mirror having a sighting axis for viewing by the operator and for directly receiving the scene or object being viewed along said sighting axis.

26. The sighting device of claim 25 with said dichroic mirror reflecting wavelengths of light of around 570 nm. and higher and transmitting lower wavelengths of light.

27. The sighting device of claim 16 with said optical fiber of said fiber optic light collector having a core portion and an outer cladding, said core portion including a light activated material to provide illumination at a preselected wavelength within said first range in response to the ambient light, said cladding being generally transparent to permit ambient light to pass radially therethrough to impinge upon the light activated material of said core portion, said lens structure being adapted to focus the ambient light radially into said core portion, said artificial light source being a radio luminescent member, said reticle structure means comprising a GRIN lens assembly including a pair of GRIN lenses connected by a dichroic layer, said dichroic layer adapted to transmit light waves over one range of wavelengths and to reflect light waves over another range of wavelengths with said one and another ranges of wavelengths being within said second range of wavelengths of said beam-splitting means, one of said first and second light source means connected to said GRIN lens assembly and adapted to produce light waves within said one range of wavelengths, and the other of said first and second light source means connected to said GRIN lens assembly and adapted to produce light waves within said another range of wavelengths.

28. The sighting device of claim 27 with said core of said first and second light source means connected to a first of said GRIN lenses for transmitting light waves of said one range of wavelengths to pass through said dichroic layer and through the second of said GRIN lenses and out from said GRIN lens assembly to said beam-splitting means, said other said other of said first and second light source means connected to said second of said GRIN lenses to transmit light waves of said another range of wavelengths to be reflected by said dichroic layer and out from said GRIN lens assembly to said beam-splitting means.

29. The sighting device of claim 28 with said first and second GRIN lenses adjusted to focus the light waves transmitted through said dichroic layer and the light waves reflected by said dichroic layer to produce reticle patterns which are substantially in coincidence.

30. A sighting device for viewing a scene or object, comprising:

reticle structure means for providing a reticle pattern for use in aiming said sighting device, ambient light source means for receiving ambient light and for providing illumination from the ambient light to said reticle structure means for illuminating said reticle pattern;

said ambient light source means comprising a fiber optic light collector defined by a first optical fiber having a preselected length and adapted to receive light directed radially inwardly into said first optical fiber over said preselected length to provide a determinable level of illumination to said reticle structure means for providing a desired level of brightness for said reticle pattern for a desired contrast with the level of illumination of the scene or object being viewed;

fiber optic means operatively connected with said ambient light source means for transmitting the light obtained from said fiber optic light collector to said reticle structure means, beam-splitting means for transmitting light waves over a first range of wavelengths and reflecting light waves over a second range of wavelengths and adapted to receive the scene or object being viewed and to transmit the scene or object with light in said first range of wavelengths;

said ambient light source means and said fiber optic means operative for transmitting light of a wavelength in said second range of wavelengths;

said reticle structure means receiving illumination from said fiber optic means and projecting said reticle pattern onto said beam-splitting means to produce a reflected image of said reticle pattern within said second range of wavelengths superimposed on the scene or object being viewed and being transmitted by said beam splitting means within said first range of wavelengths, said ambient light source means comprising a lens structure operatively connected with said fiber optic light collector for focusing ambient light radially inwardly into said first optical fiber generally over said preselected length.

31. The sighting device of claim 30 with said fiber optic light collector being defined by a generally serpentine arrangement of said first optical fiber and located in a generally unidirectional plane.

32. The sighting device of claim 31 with said lens structure including a lens track having a serpentine shape substantially similar to said serpentine arrangement of said fiber optic light collector and located generally in confrontation therewith whereby the ambient light received will be focused generally over said preselected length of said first optical fiber.

33. The sighting device of claim 32 with said first light source means comprising a retainer having a groove structure having said serpentine arrangement of said first optical fiber and adapted to receive said first optical fiber and to support said first optical fiber to retain said serpentine arrangement.

34. The sighting device of claim 33 with said sighting device including a housing and including support means operatively connected with said housing for supporting said fiber optic collector, said lens structure and said retainer and said beam splitting means with a portion of said serpentine arrangement generally surrounding said beam splitting means.

35. The sighting device of claim 34 with said beamsplitting means being a dichroic mirror having a sighting axis for viewing by the operator and for directly receiving the scene or object being viewed along said sighting axis.

36. The sighting device of claim 35 with said dichroic mirror reflecting wavelengths of light of around 570 nm. and higher and transmitting lower wavelengths of light.

37. The sighting device of claim 32 with said first light source means comprising a retainer having a groove structure having said serpentine arrangement of said first optical fiber and adapted to receive said first optical fiber and to support said first optical fiber to retain said serpentine arrangement, said retainer having a reflective surface in confrontation with said first optical fiber for reflecting light into said first optical fiber.

38. The sighting device of claim 30 with said first optical fiber of said fiber optic light collector having a core portion and an outer casing, said core portion including light activated material to provide illumination at a preselected wavelength in response to the ambient light directed into said core portion, said casing being generally transparent to permit ambient light to pass radially therethrough to impinge upon said light activated material of said core portion.

39. The sighting device of claim 30 with said first optical fiber of said fiber optic light collector having a core portion and an outer casing, said core portion including a light activated material to provide illumination of a preselected wavelength in response to the ambient light directed into said core portion, said casing being generally transparent to permit ambient light to pass radially therethrough to impinge upon said light activated material of said core portion, said lens structure adapted to be located proximate to said first optical fiber of said fiber optic light collector and having a lens structure adapted to focus the ambient light radially into said core portion of said optical fiber generally over said preselected length.

40. The sighting device of claim 39 with said outer casing having a generally arcuate shape capable of providing a lens effect, said lens structure provided with predetermined focal point selected relative to the lens effect of said outer casing to provide combined focusing of the ambient light radially into said core portion.

41. The sighting device of claim 30 with said preselected length of said first optical fiber providing a predetermined contrast ratio between the illuminance of said reticle pattern and the illuminance of the scene or object being viewed, said contrast ratio being determined by the relationship of (DI−BI)/BI where DI is the illuminance in foot candles of said reticle pattern as viewed by the operator and BI is the illuminance of the scene or object being viewed and with said predetermined contrast ratio being in a range of from between around 200 to around 250 over a range of illuminance of the scene of from between around 1000 foot candles to around 0.1 foot candles.

42. The sighting device of claim 31 with said contrast ratio being generally around 230 over said range of illuminance of the scene or object.

43. In a sighting device for viewing a scene or object and having a reticle structure for providing a reticle pattern for use in viewing the scene or object, a source of light for illuminating the reticle pattern, comprising:
   ambient light source means for receiving ambient light and for providing illumination from the ambient light to the reticle structure for illuminating the reticle pattern;
   said ambient light source means comprising a fiber optic light collector defined by a first optical fiber constructed of a light activated material for providing illumination in response to light incident thereon, said first optical fiber having a preselected length and adapted to receive light directed radially inwardly into said first optical fiber over said preselected length to provide a determinable level of illumination for the reticle structure for providing a desired level of brightness for said reticle pattern;
   said ambient light source means comprising a lens structure operatively connected with said fiber optic light collector for focusing ambient light radially inwardly into said first optical fiber generally over said preselected length.

44. The sighting device of claim 43 with said first optical fiber of said fiber optic light collector having a core portion and an outer casing, said core portion including light activated material to provide illumination at a preselected wavelength in response to the ambient light directed into said core portion, said casing being generally transparent to permit ambient light to pass radially therethrough to impinge upon said light activated material of said core portion.

45. A sighting device of claim 43 with said first optical fiber of said fiber optic light collector having a core portion and an outer casing, said core portion including a light activated material to provide illumination of a preselected wavelength in response to the ambient light directed into said core portion, said casing being generally transparent to permit ambient light to pass radially therethrough to impinge upon said light activated material of said core portion, said lens structure adapted to be located proximate to said first optical fiber of said fiber optic light collector and having a lens structure adapted to focus the ambient light radially into said core portion of said optical fiber generally over said preselected length.

46. The sighting device of claim 45 with said outer casing having a generally arcuate shape capable of providing a lens effect, said lens structure provided with predetermined focal point selected relative to the lens effect of said outer casing to provide combined focusing of the ambient light radially into said core portion.

47. The sighting device of claim 43 with said fiber optic light collector being defined by a generally serpentine arrangement of said first optical fiber and located in a generally unidirectional plane.

48. The sighting device of claim 47 with said lens structure including a lens track having a serpentine shape substantially similar to said serpentine arrangement of said fiber optic light collector and located generally in confrontation therewith whereby the ambient light received will be focused generally over said preselected length of said first optical fiber.

49. The sighting device of claim 48 with said first light source means comprising a retainer having a groove structure having said serpentine arrangement of said first optical fiber and adapted to receive said first optical fiber and to support said first optical fiber to retain said serpentine arrangement.

50. The sighting device of claim 49 with said sighting device including a housing and including support means operatively connected with said housing for supporting said fiber optic collector, said lens structure and said retainer and said beam splitting means with a portion of said serpentine arrangement generally surrounding said beam splitting means.

51. The sighting device of claim 47 with said first light source means comprising a retainer having a groove structure having said serpentine arrangement of said first optical fiber and adapted to receive said first optical fiber and to support said first optical fiber to retain said serpentine arrangement, said retainer having a reflective surface in confrontation with said first optical fiber for reflecting light into said first optical fiber.

52. In the sighting device of claim 43, said light activated material providing illumination having a wavelength generally around 570 nm. and higher.

* * * * *